US012233424B2

(12) United States Patent
Risi

(10) Patent No.: US 12,233,424 B2
(45) Date of Patent: Feb. 25, 2025

(54) BUCKET CRUSHER

(71) Applicant: SIMEX ENGINEERING S.R.L., San Giovanni in Persiceto (IT)

(72) Inventor: Mirco Risi, San Giovanni in Persiceto (IT)

(73) Assignee: SIMEX ENGINEERING S.R.L., San Giovanni in Persiceto (IT)

( * ) Notice: Subject to any disclaimer, the term of this patent is extended or adjusted under 35 U.S.C. 154(b) by 278 days.

(21) Appl. No.: 17/878,715

(22) Filed: Aug. 1, 2022

(65) Prior Publication Data

US 2023/0049703 A1 Feb. 16, 2023

(30) Foreign Application Priority Data

Aug. 3, 2021 (IT) ........................ 102021000020906

(51) Int. Cl.

| | |
|---|---|
| ***B02C 21/02*** | (2006.01) |
| ***B02C 18/14*** | (2006.01) |
| ***B02C 18/18*** | (2006.01) |
| ***E02F 3/407*** | (2006.01) |
| ***E02F 3/96*** | (2006.01) |

(52) U.S. Cl.

CPC ............ *B02C 18/145* (2013.01); *B02C 18/18* (2013.01); *B02C 21/02* (2013.01); *B02C 21/026* (2013.01); *E02F 3/407* (2013.01); *E02F 3/965* (2013.01)

(58) Field of Classification Search

CPC ..... B02C 21/02; B02C 21/06; B02C 13/2804; B02C 4/12; B02C 4/30; B02C 18/145; E02F 3/407; E02F 3/965

See application file for complete search history.

(56) References Cited

U.S. PATENT DOCUMENTS 4,311,284 A * 1/1982 Ratcliff, Jr. ......... B02C 13/2804 241/295
4,344,581 A 8/1982 Redemann
(Continued)

FOREIGN PATENT DOCUMENTS

CA 2848983 A1 10/2014
EP 0758711 A2 * 2/1997 ............. E21C 35/18
(Continued)

OTHER PUBLICATIONS

European Patent Office, Extended Search Report issued in Application No. 22187805, mailed Dec. 12, 2022.
(Continued)

*Primary Examiner* — Faye Francis
(74) *Attorney, Agent, or Firm* — Ferguson Case Orr Paterson

(57) ABSTRACT

A bucket crusher has a box-shaped bucket body defining a loading compartment and an unloading opening, a crusher unit configured to crush sheet material and having a cylinder with a plurality of crusher teeth connected to a cylinder wall, each crusher tooth of the plurality of crusher teeth extending between a proximal end and a distal end. The plurality of crusher teeth has at least one high crusher tooth and at least one low crusher tooth. The distance between the cylinder wall and the distal end of the at least one high crusher tooth is greater than the distance between the cylinder wall and the distal end of the at least one low crusher tooth.

11 Claims, 10 Drawing Sheets

(56) References Cited

U.S. PATENT DOCUMENTS

| | | | | |
|---|---|---|---|---|
| 5,078,540 | A * | 1/1992 | Jakob | E01C 23/088<br>404/90 |
| 5,431,349 | A * | 7/1995 | Purser | E02F 7/06<br>241/222 |
| 5,887,810 | A * | 3/1999 | Maruyama | E02F 7/06<br>241/189.1 |
| 6,871,807 | B2 * | 3/2005 | Rossi, Jr. | B02C 13/30<br>241/189.1 |
| 7,168,501 | B2 * | 1/2007 | Willibald | F41H 11/26<br>172/123 |
| 7,311,278 | B2 * | 12/2007 | Kitsukawa | E02F 3/407<br>241/194 |
| 7,475,949 | B2 * | 1/2009 | Helsel | B28D 1/188<br>299/108 |
| 7,513,449 | B2 * | 4/2009 | Gross | A01G 23/067<br>241/261.1 |
| 9,199,243 | B2 * | 12/2015 | Malkamäki | B07B 1/20 |
| 9,238,893 | B2 * | 1/2016 | Latham | E01C 23/088 |
| 9,308,533 | B2 * | 4/2016 | Gross | B02C 18/144 |
| 9,945,094 | B2 * | 4/2018 | Azzolin | B02C 1/02 |
| 11,572,665 | B2 * | 2/2023 | Sondreal | B28D 1/188 |
| 2004/0050985 | A1 * | 3/2004 | Rossi, Jr. | B02C 13/30<br>241/101.72 |
| 2008/0203202 | A1 * | 8/2008 | Clark | B02C 13/09<br>241/197 |

FOREIGN PATENT DOCUMENTS

| | | | | | |
|---|---|---|---|---|---|
| FI | 12624 | U1 | | 4/2020 | |
| GB | 2454668 | A | * | 5/2009 | B02C 4/12 |
| JP | 2000070738 | A | | 3/2000 | |
| JP | 2001293385 | A | * | 10/2001 | E02F 3/407 |
| JP | 2005002722 | A | * | 1/2005 | B02C 21/02 |
| JP | 2005220513 | A | * | 8/2005 | B02C 21/02 |
| WO | WO-2012028766 | A1 | * | 3/2012 | B02C 13/09 |

OTHER PUBLICATIONS

Search Report for IT 102021000020906 dated Apr. 25, 2022, Munich, DE.

* cited by examiner

BUCKET CRUSHER

CROSS-REFERENCE TO RELATED APPLICATION

This application claims priority to Italian Patent Application No. 102021000020906 filed on Aug. 3, 2021, the contents of which are incorporated by reference in their entirety.

FIELD OF THE INVENTION

The present invention relates to a bucket crusher adapted to be applied on machines for moving sheet material, in particular asphalt sheets, plasterboard sheets, wooden pallets or bricks, such as excavating or loading machines, for picking up, crushing and screening sheet material.

BACKGROUND OF THE INVENTION

Bucket crushers are known, which are equipped with a box-shaped bucket body and at least one crusher unit arranged inside the box-shaped bucket body and configured to crush sheet material.

The crusher unit of such known bucket crushers generally comprises at least one cylinder which is rotatable about a rotation axis, and a plurality of crusher teeth connected to the cylinder and configured to compress and crush sheet material.

The crusher teeth have substantially the same shape and are substantially equidistant and positioned in a regular manner on the cylinder.

A bucket crusher of this type is described, for example, in FI12624U1 Ajutech OY.

Such a known type of bucket crusher, despite being adapted to crush sheet material, requires long processing times since the sheet material loaded inside the box-shaped bucket body tends to escape the grasping of the crusher teeth.

With a further disadvantage, such a known type of bucket crusher is not adapted to sufficiently move the sheet material to be crushed, causing a further reduction of the productivity of the bucket crusher.

The need is therefore felt to have improved bucket crushers which ensure greater productivity.

SUMMARY OF THE INVENTION

It is the object of the present invention to provide a bucket crusher which solves at least some of the drawbacks of the prior art.

It is a particular object of the present invention to provide an improved bucket crusher, which increases the grip on the sheet material to be crushed by the crusher teeth, and which therefore reduces processing times.

It is a further particular object of the present invention to provide an improved bucket crusher, which increases the movement of the sheet material to be crushed, and therefore has greater productivity.

These and other objects are achieved by a bucket crusher as described and claimed herein.

Preferred and advantageous embodiments of the present invention are also described.

BRIEF DESCRIPTION OF THE DRAWINGS

In order to better understand the present invention and appreciate the advantages thereof, some non-limiting exemplary embodiments thereof will be described below with reference to the accompanying drawings, in which.

DETAILED DESCRIPTION

Figure 1:
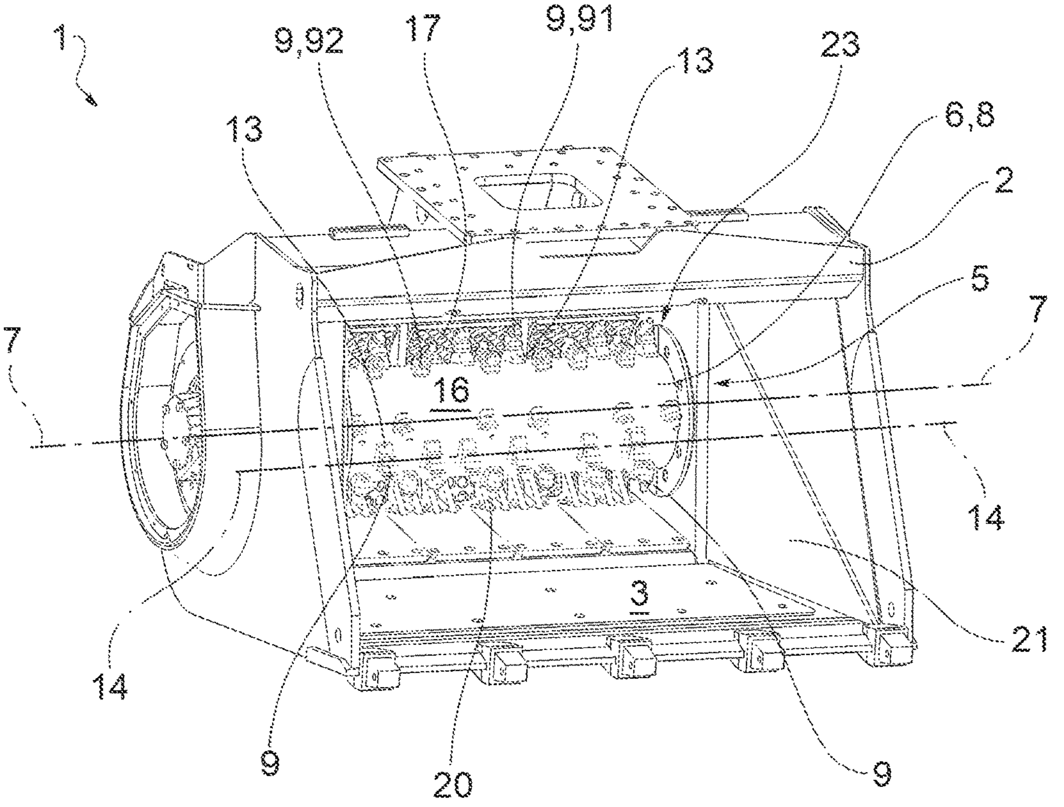
FIG. 1 shows a front perspective view of a bucket crusher, according to an embodiment of the present invention.
Figure 2:
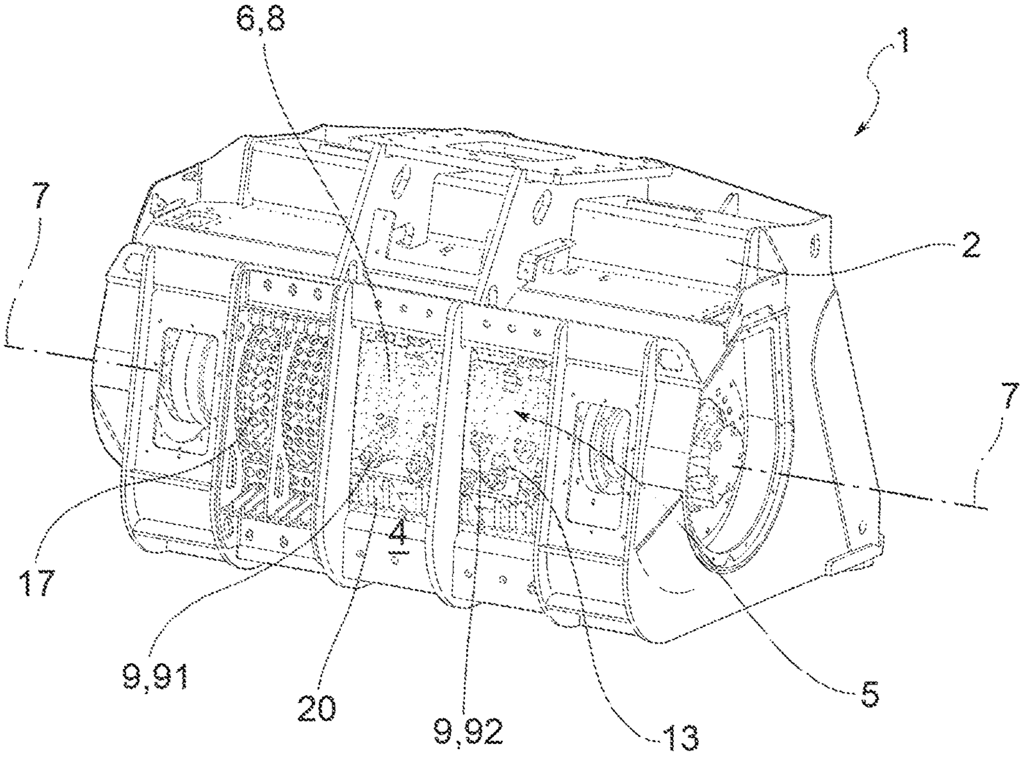
FIG. 2 shows a rear perspective view of the bucket crusher in FIG. 1.
Figure 3:
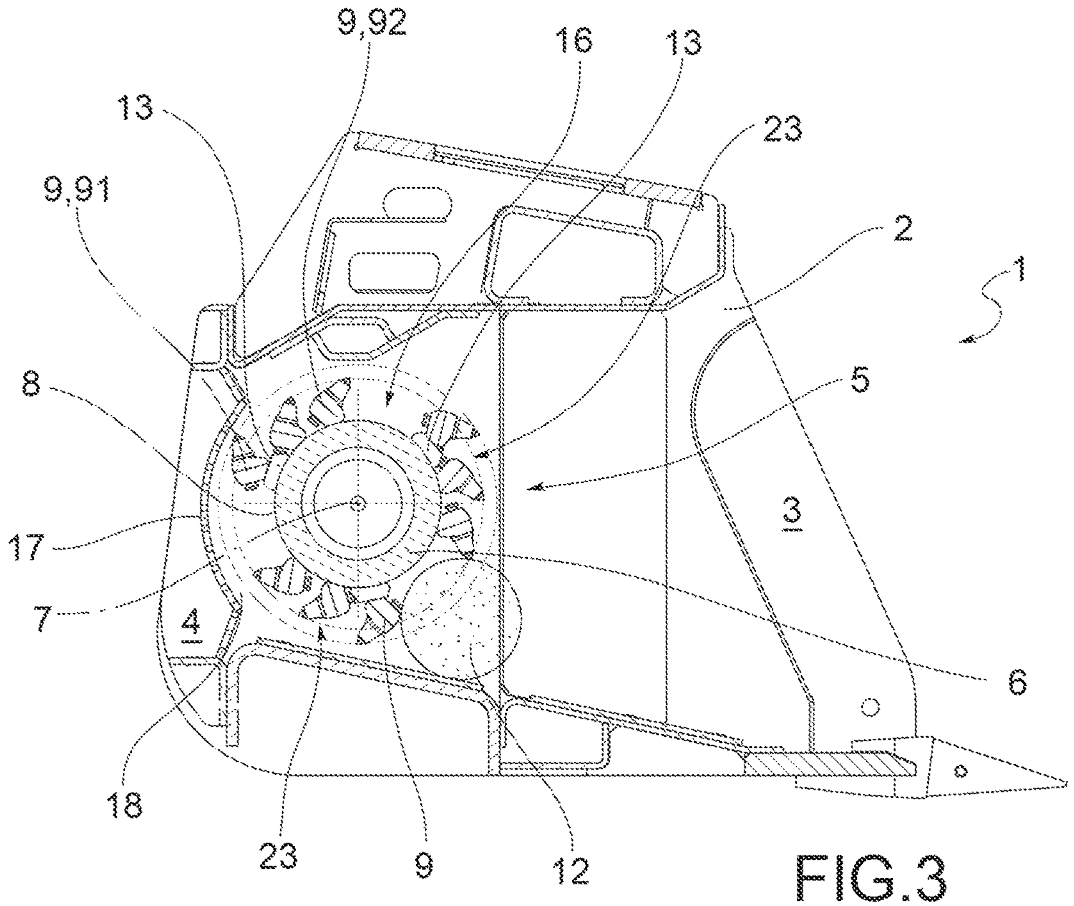
FIG. 3 shows a longitudinal sectional view of a bucket crusher, according to an embodiment, in a first operating step.
Figure 4:
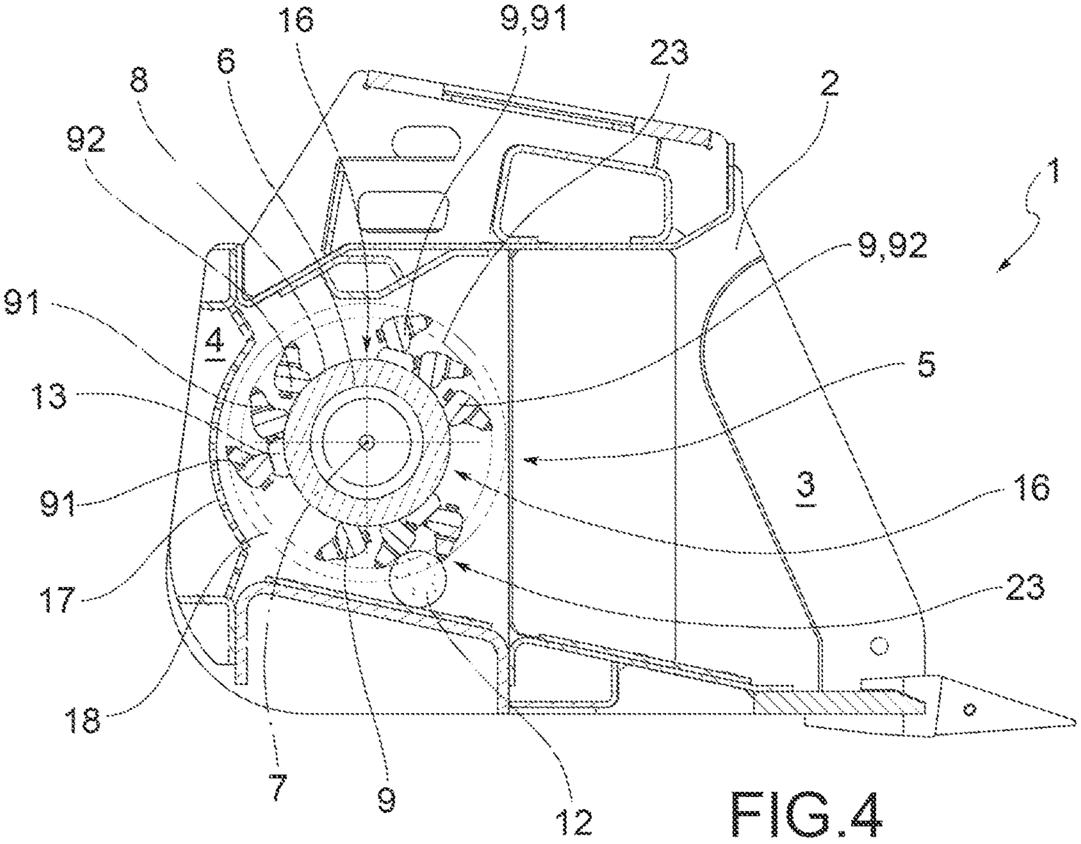
FIG. 4 shows a further longitudinal sectional view of the bucket crusher in FIG. 3, in a second operating step.
Figure 5:
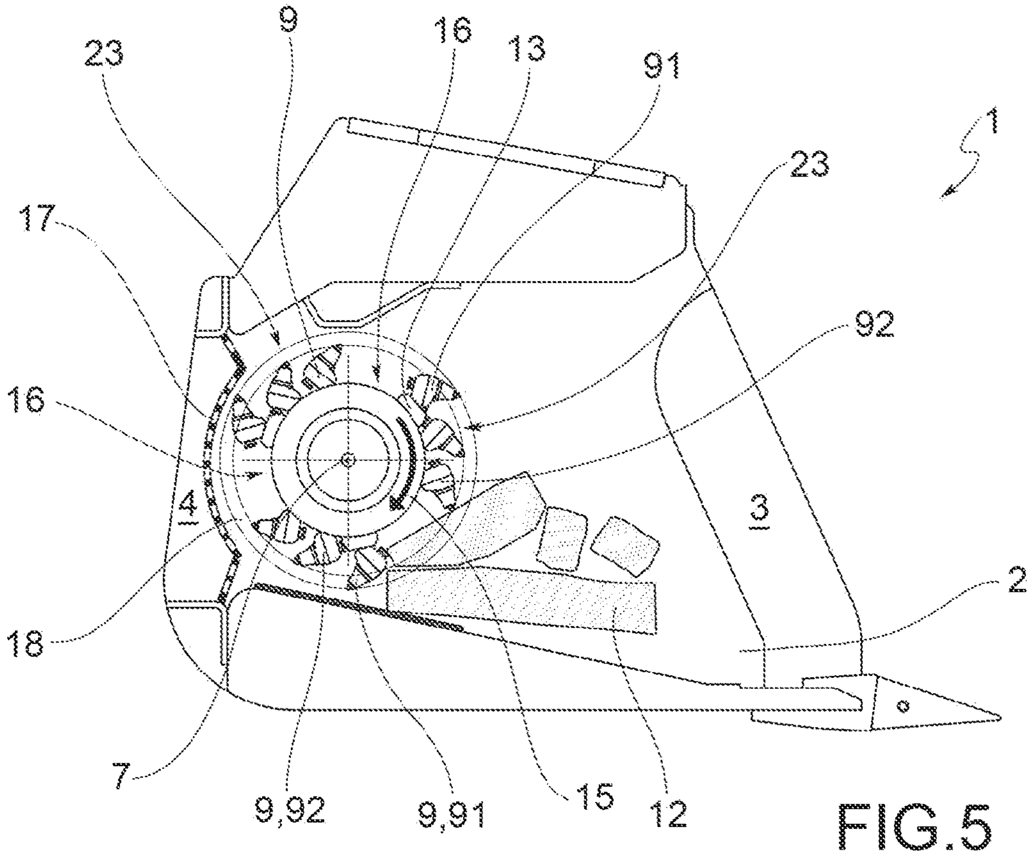
FIG. 5 shows a longitudinal sectional view of a bucket crusher, according to an embodiment, in a first operating step.
Figure 6:
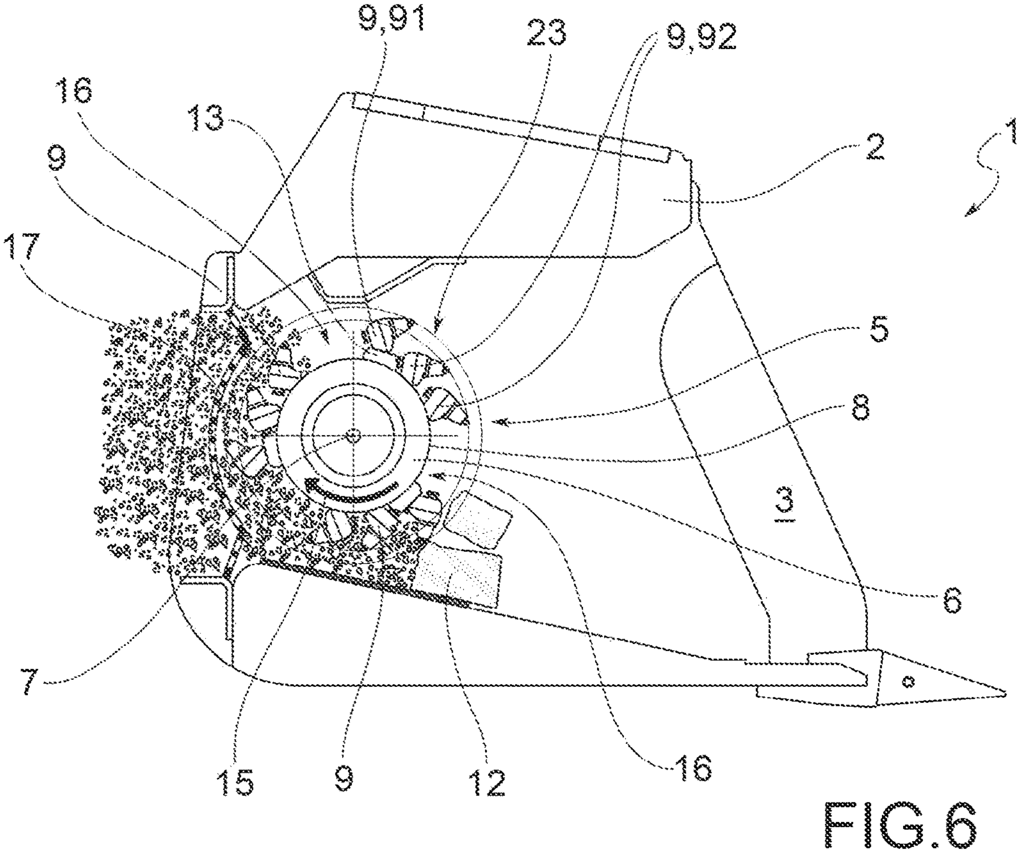
FIG. 6 shows a further longitudinal sectional view of the bucket crusher in FIG. 3, in a second operating step.
Figure 7:
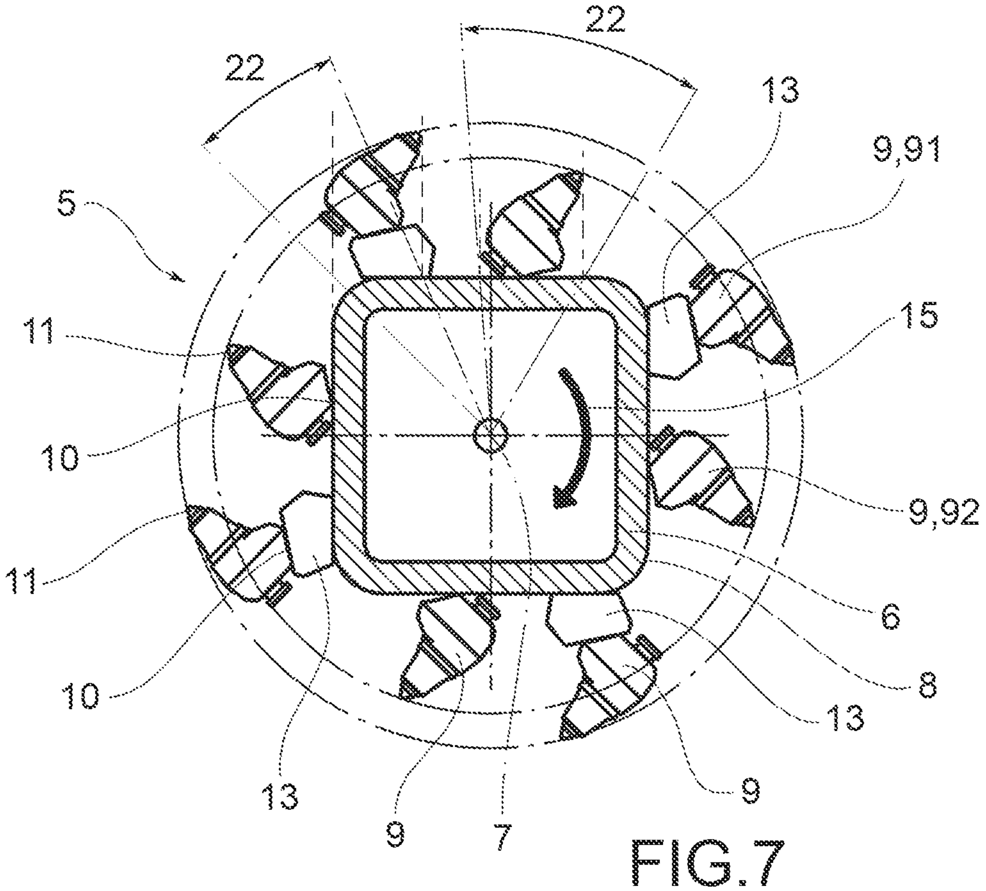
FIG. 7 shows a cross-sectional view of a component of a bucket crusher, according to an embodiment of the present invention.

With reference to the Figures, a bucket crusher is generally indicated with reference numeral 1.

The bucket crusher 1 comprises a box-shaped bucket body 2 which defines a loading compartment 3 and an unloading opening 4.

The bucket crusher 1 comprises at least one crusher unit 5 configured to crush sheet material 12, and in particular asphalt sheets, plasterboard sheets, wooden pallets or bricks.

The crusher unit 5 comprises a cylinder 6.

The cylinder 6 is rotatable about a rotation axis 7 and forms a cylinder wall 8.

The crusher unit 5 further comprises a plurality of crusher teeth 9 connected to the cylinder wall 8.

Each crusher tooth 9 extends between a proximal end 10 and a distal end 11.

The proximal end 10 faces the cylinder wall 8, while the distal end 11 is opposite to the cylinder wall 8.

According to an aspect of the present invention, the plurality of crusher teeth 9 comprises at least one high crusher tooth 91 and at least one low crusher tooth 92.

The distance between the cylinder wall 8 and the distal end 11 of the at least one high crusher tooth 91 is greater than the distance between the cylinder wall 8 and the distal end 11 of the low crusher tooth 92.

Advantageously, the different height of the crusher teeth 9 with respect to the cylinder wall 8 ensures a greater grip on the sheet material 12 to be crushed by the crusher teeth, resulting in a reduction in processing times.

With a further advantage, the different height between the high crusher teeth 91 and the low crusher teeth 92 achieves a greater movement of the sheet material 12 to be crushed, resulting in an increase in the productivity of the bucket crusher 1.

Furthermore, the bucket crusher 1 thus configured is adapted to crush the sheet material so as to carry out a recycling pre-treatment, and therefore to facilitate the subsequent recycling thereof.

According to an embodiment, the crusher unit 5 comprises a plurality of high crusher teeth 91 and a plurality of low crusher teeth 92.

Preferably, the ratio of the number of high crusher teeth 91 to the number of low crusher teeth 92 is between 1:3 and 3:1.

Even more preferably, the ratio of the number of high crusher teeth 91 to the number of low crusher teeth 92 is between 1:2 and 2:1.

Even more preferably, the ratio of the number of high crusher teeth 91 to low crusher teeth 92 is approximately 1:2.

Alternatively, the ratio of the number of high crusher teeth 91 to low crusher teeth 92 is approximately 1:1.

Advantageously, such a numerical ratio of high crusher teeth 91 to low crusher teeth 92 increases the movement of the sheet material 12, increases the grip on the sheet material 12 and reduces the time required for crushing thereof.

According to an embodiment, the ratio of the height of a high crusher tooth 91 to the height of a low crusher tooth 92 is between 3:1 and 11:10, preferably between 2:1 and 11:10.

Even more preferably, the ratio of the height of a high crusher tooth 91 to the height of a low crusher tooth 92 is approximately 3:2.

"Height" of a crusher tooth means the distance between the distal end 11 of the respective high crusher tooth 91 or low crusher tooth 92, and the cylinder wall 8.

According to an embodiment, the crusher unit 5 comprises at least one base element 13 connected to the cylinder wall 8.

Each base element 13 is interposed between the cylinder wall 8 and a respective high crusher tooth 91, so as to raise the respective high crusher tooth 91 with respect to the one or more low crusher teeth 92.

In accordance with this embodiment, preferably, the high crusher teeth 91 substantially have the same shape as the low crusher teeth 92.

Advantageously, the use of high crusher teeth 91 and low crusher teeth 92 of the same shape, in which the high crusher teeth 91 are placed on the plurality of base elements 13, greatly reduces the production and maintenance costs of the bucket crusher 1.

According to one embodiment, the ratio of the height of a base element 13 to the height of a low crusher tooth 92, with reference to the cylinder wall 8, is between 1:6 and 1:1.

Preferably, the ratio of the height of a base element 13 to a low crusher tooth 92, is between 1:4 and 1:2.

Even more preferably, the ratio of the height of a base element 13 to a low crusher tooth 92 is approximately 1:3.

According to an embodiment, the base element 13 is a prismatic block defining two opposite bases, in which a base is fixed to the cylinder wall 8 and the opposite base is fixed to the respective high crusher tooth 91.

According to an embodiment, the cylinder wall 8 defines, on a plane transverse to the rotation axis 7, a polygonal section having at least three sides.

Preferably, the cylinder wall 8 defines, on a plane transverse to the rotation axis 7, a polygonal section having four sides.

Alternatively, the cylinder wall 8 defines, in a plane transverse to the rotation axis 7, a polygonal section having six sides.

Advantageously, the polygonal section periodically generates, during rotation of the cylinder 6, empty spaces within which the sheet material 12 is caught and subsequently compressed and crushed.

According to an alternative embodiment, the cylinder wall 8 defines, on a plane transverse to the rotation axis 7, a circular section.

According to an embodiment, the bucket crusher 1 comprises at least two crusher units 5.

On a plane transverse to a respective rotation axis 7, in one of the two crusher units 5 the cylinder wall 8 defines a polygonal section having at least three sides, or it defines a circular section.

In the other of the two crushing units 5 the cylinder wall 8 defines a polygonal section having at least three sides, or it defines a circular section.

Advantageously, a different shape of the two crusher units 5 ensures a strong grip on the sheet material 12 and reduces the time required for the crushing thereof.

According to an embodiment, the crusher teeth 9 are positioned on the cylinder wall 8 according to an irregular arrangement.

Irregular arrangement means an arrangement which does not consist of a recurring positioning pattern or a repetitive positioning pattern.

Advantageously, the irregular arrangement of the crusher teeth 9 increases the movement of the sheet material 12 to be crushed and speeds up the crushing process thereof.

According to an embodiment, each crusher tooth 9 defines a tooth angular dimension 22.

"Tooth angular dimension 22" of a crusher tooth 9 means the angular distance of maximum size, with reference to the rotation axis 7, which can be defined by the projection of the crusher tooth 9 on the cylinder wall 8.

"Projection of the crusher tooth 9 on the cylinder wall 8", means the trace defined on the cylinder wall 8 by the intersection of the cylinder wall 8 with the perpendiculars brought by each geometric point of the crusher tooth 9 to the cylinder wall 8.

In the following description, tooth angular dimension 22 refers to an angular distance equal to the arithmetic mean of the tooth angular dimensions 22 of each crusher tooth 9 of the crusher unit 5.

According to an embodiment, the crusher teeth 9 positioned on the cylinder wall 8 define a plurality of axial units 23 of crusher teeth 9.

Each axial unit 23 is defined by a plurality of crusher teeth 9 following one another in an angular direction, with reference to the rotation axis 7, and in which the angular distance between each crusher tooth 9 and the previous or subsequent crusher tooth 9 is less than the tooth angular dimension 22.

Crusher tooth 9 "following" another crusher tooth 9 means the crusher tooth 9 positioned at the minimum angular distance from the other crusher tooth 9, and in which the angular distance is determined with reference to the projection of the crusher teeth 9, to the rotation axis 7 and to a predetermined rotation direction 15, and is calculated with reference to the distance between the projections of the crusher teeth 9 on the cylinder wall 8.

The terms "previous" and "subsequent" refer to the same predetermined rotation direction 15.

Therefore, such a configuration defines on the cylinder wall 8 a plurality of empty spaces 16 which have no crusher teeth 9, which have an angular extension equal to at least one tooth angular dimension 22.

In accordance with an embodiment, such empty spaces 16 extend in a direction parallel to the rotation axis 7, for the entire length of the cylinder wall 8.

"Length" means the size of the cylinder wall 8 measured in a direction parallel to the rotation axis 7.

Advantageously, such empty spaces 16 interposed between following axial units 23, favor grasping of the sheet material 12 to be crushed by the crushing unit 5.

In particular, the presence of such empty spaces 16 reduces the possibility that the sheet material 12 to be crushed "floats" above the crusher teeth 9 without being caught, and then compressed and crushed, by them.

According to an embodiment, the ratio of the angular extension of an empty space 16 to the tooth angular dimension 22, is between 4:1 and 1:1, preferably between 3:1 and 1:1, even more preferably between 2:1 and 3:2.

According to an embodiment, all the empty spaces 16 have a substantially identical angular extension.

Figure 8:
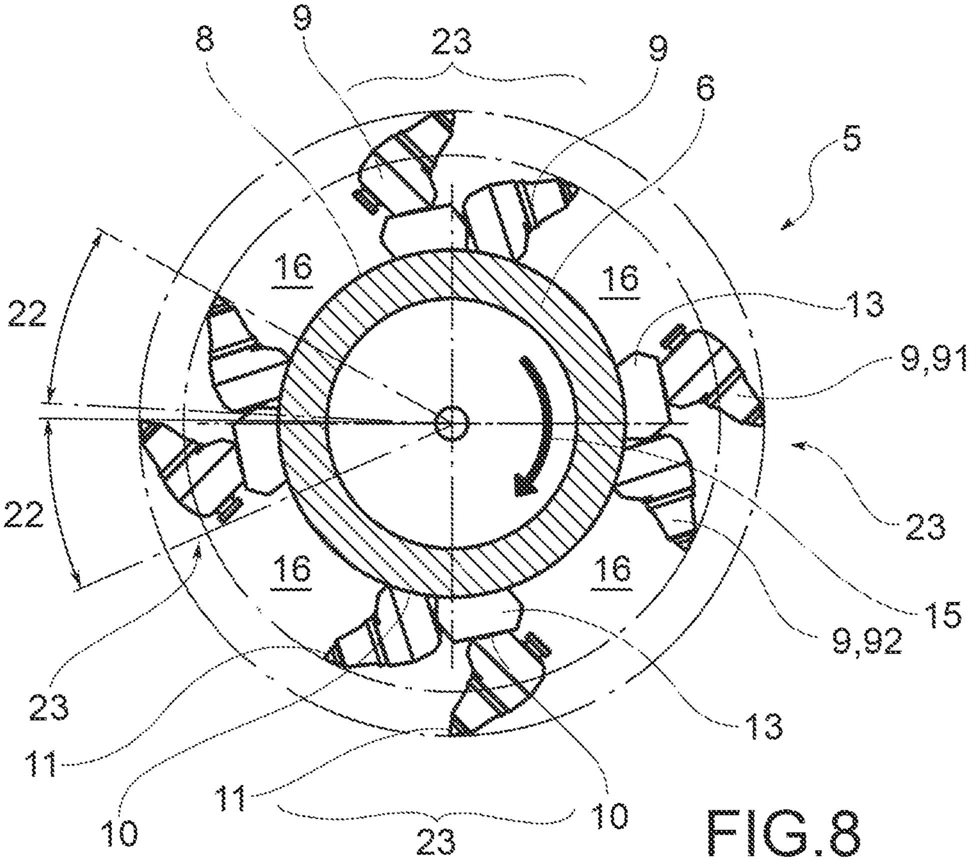
FIG. 8 shows a cross-sectional view of a component of a bucket crusher, according to a further embodiment of the present invention.
Figure 9:
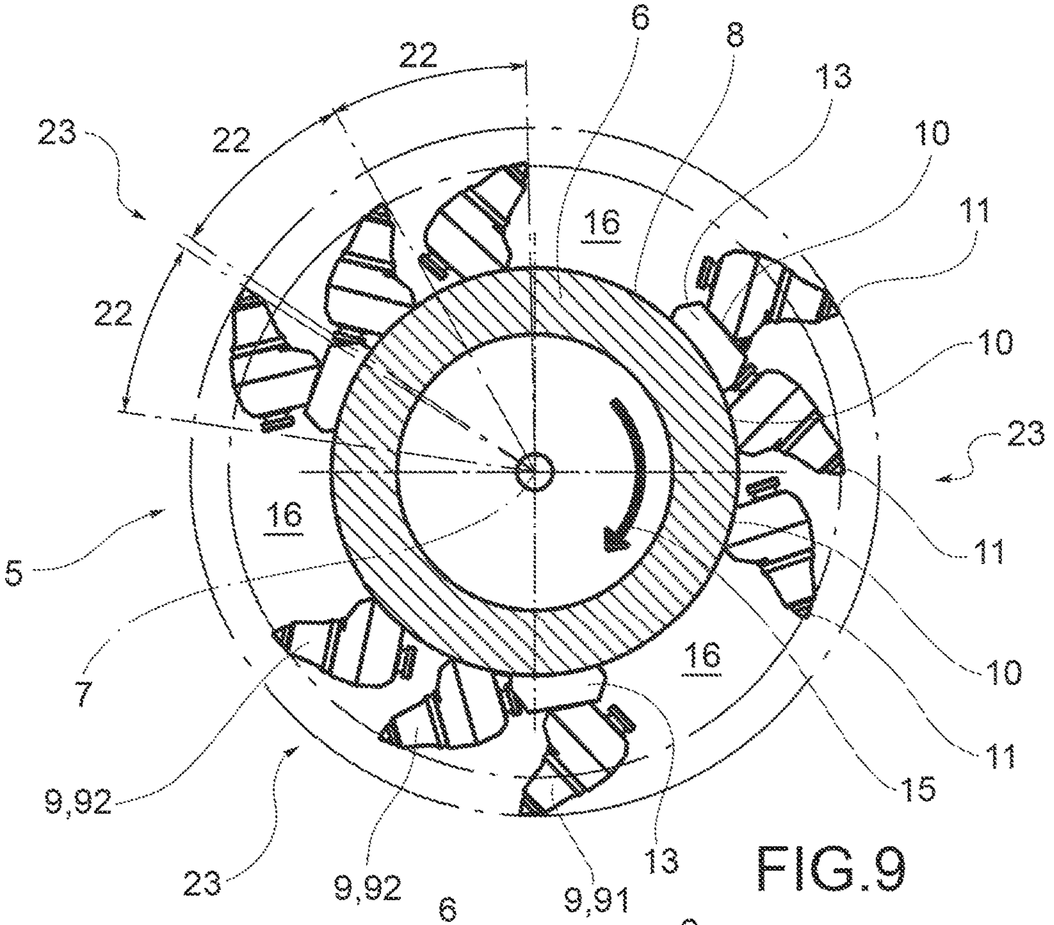
FIG. 9 shows a cross-sectional view of a component of a bucket crusher, according to a further embodiment of the present invention.
Figure 10:
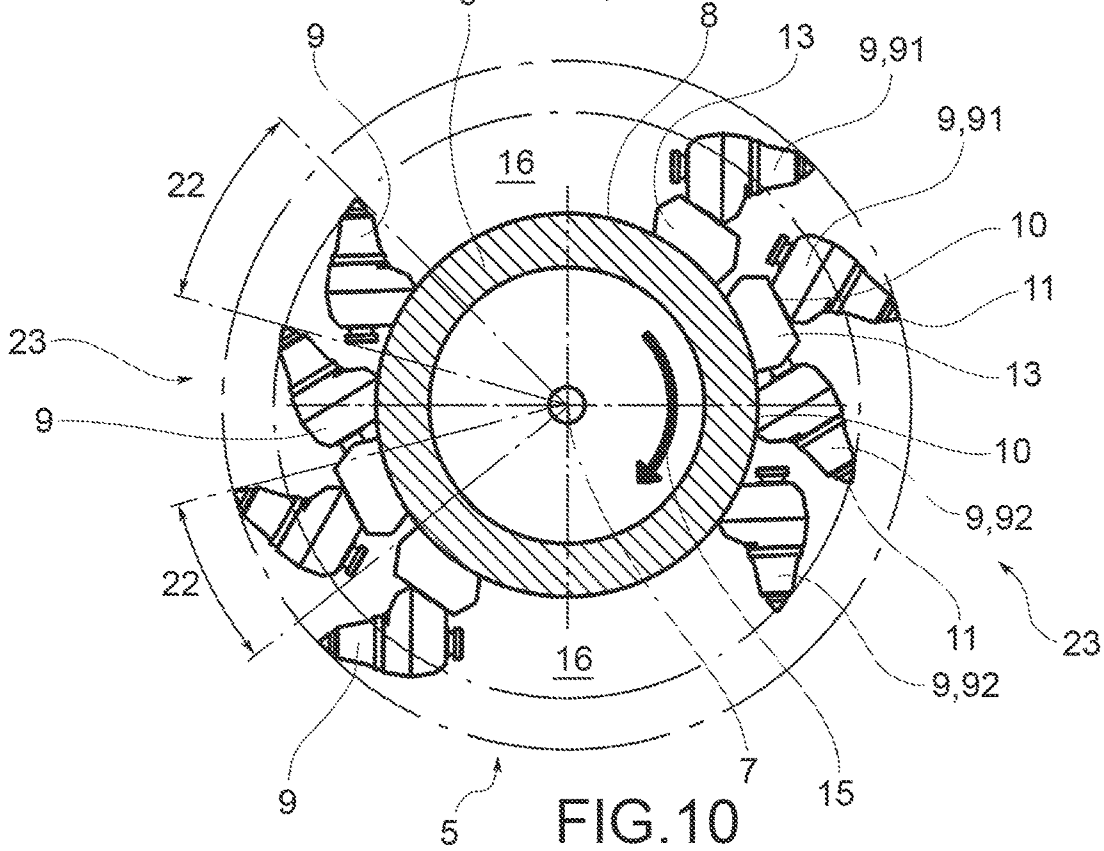
FIG. 10 shows a cross-sectional view of a component of a bucket crusher, according to a further embodiment of the present invention.

According to preferred embodiments, the crusher unit 5 comprises four axial units 23 of crusher teeth 9 (FIG. 8), or three axial units 23 of crusher teeth 9 (FIG. 9), or two axial units 23 of crusher teeth 9 (FIG. 10).

Figure 11:
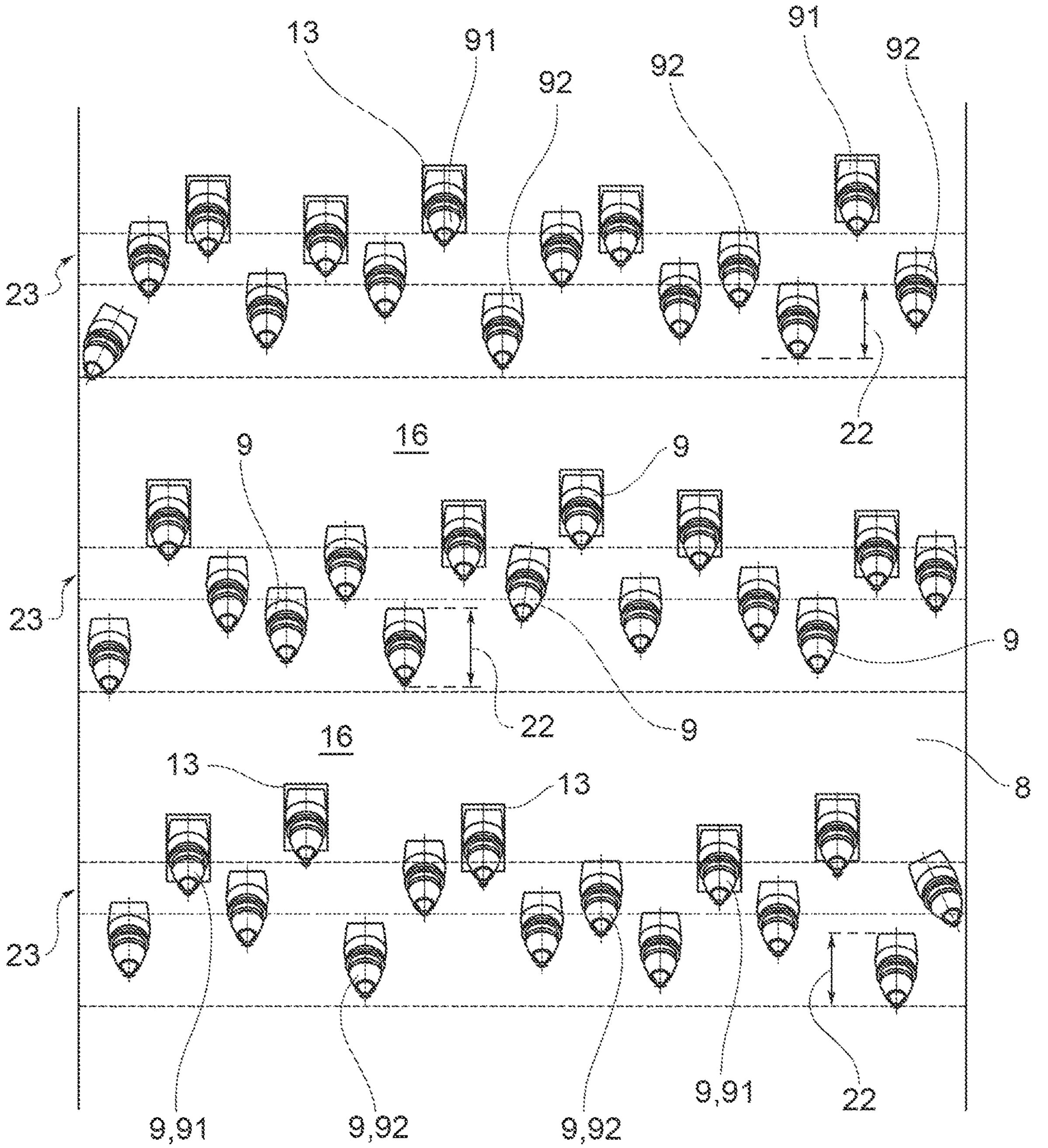
FIG. 11 shows a front view of a planar distribution of the crusher teeth of a bucket crusher, according to an embodiment of the present invention.
Figure 12:
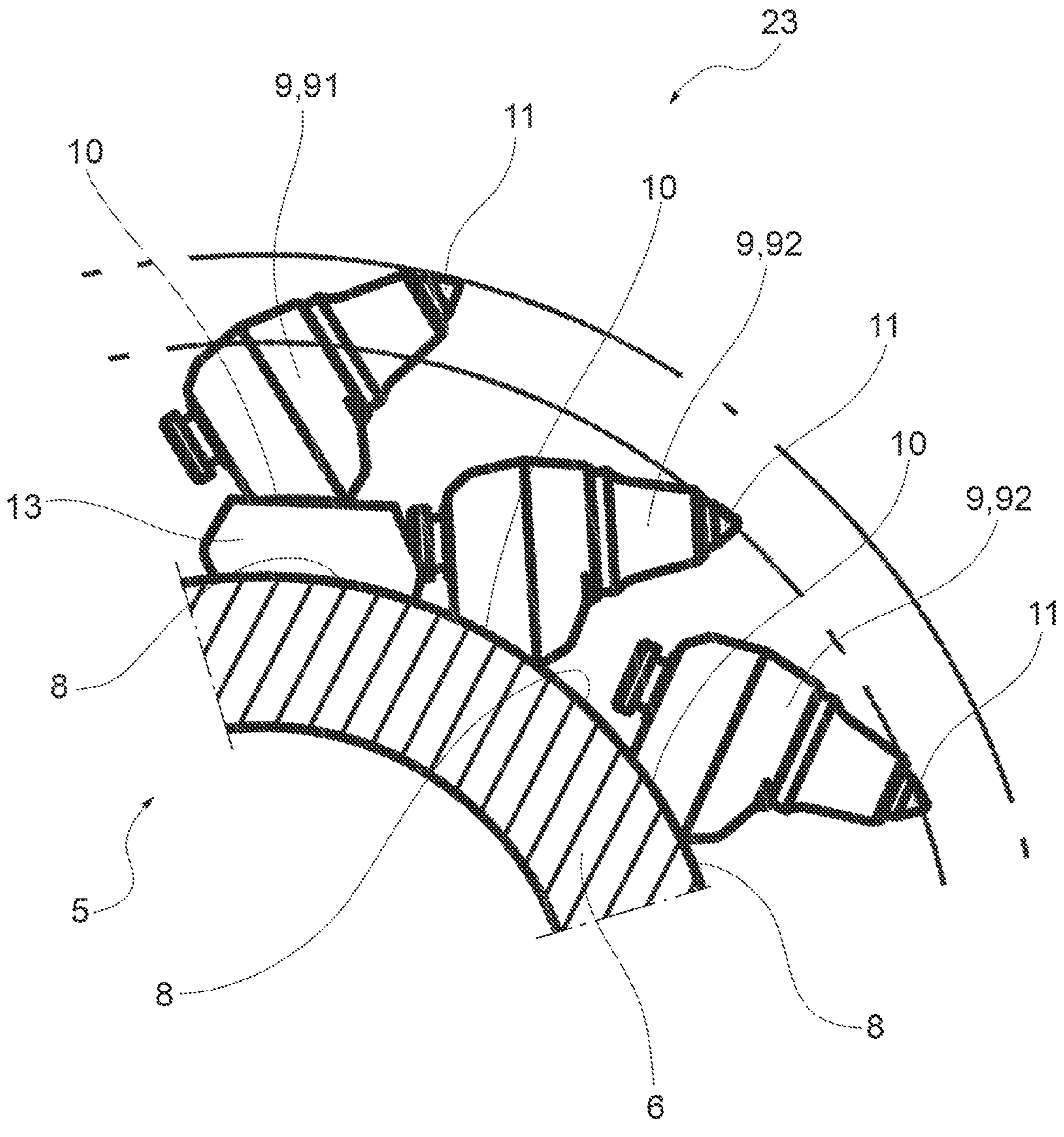
FIG. 12 shows a longitudinal sectional view of a detail of the bucket crusher in FIG. 9.

According to an embodiment, all the crusher teeth 9 of the same axial unit 23 are offset with respect to one another in the angular direction (FIG. 11).

Advantageously, even a minimal offset between the crusher teeth 9 of the same axial unit 23 allows locating the maximum effort always on only one crusher tooth 9 at a time. This allows acting on the sheet to be crushed always with maximum effort, and therefore the possibility of jamming the cylinder 6 is thus reduced.

According to an embodiment, at least one axial unit 23 consists exclusively of high crusher teeth 91.

According to an embodiment, at least one axial unit 23 exclusively consists of low crusher teeth 92.

According to an alternative embodiment, each axial unit 23 comprises both at least one high crusher tooth 91 and at least one low crusher tooth 92.

According to an embodiment, the crusher teeth 9 are positioned on the cylinder wall 8 according to a substantially helical arrangement.

Specifically, the crusher teeth 9 can define one or more helices of crusher teeth 9.

In the embodiment in which the crusher teeth 9 define a plurality of helices, the angular distance between two helices of the plurality of helices is at least equal to the tooth angular dimension 22. The angular distance is determined with reference to the rotation axis 7.

According to an alternative embodiment, the crusher teeth 9 are positioned on the cylinder wall 8 so as to define, in a direction substantially parallel to the rotation axis 7, a plurality of zig-zag lines.

The angular distance between two following zig-zag lines is at least equal to the tooth angular dimension 22. The angular distance is determined with reference to the rotation axis 7.

According to an embodiment, the crusher teeth 9 positioned on the cylinder wall 8 define a plurality of rows 14 of crusher teeth 9, in which each row 14 consists of crusher teeth 9 substantially positioned on a same axis parallel to the rotation axis 7 of the cylinder 6.

Preferably, each row 14 consists of two to nine crusher teeth 9.

According to an embodiment, at least one row 14 exclusively consists of high crusher teeth 91, and at least one further row 14 exclusively consists of low crusher teeth 92.

According to a preferred embodiment, each row 14 of the crusher unit 5 exclusively consists of either high crusher teeth 91 or low crusher teeth 92.

According to an alternative embodiment, at least one row 14 comprises both at least one high crusher tooth 91 and at least one low crusher tooth 92.

According to a preferred embodiment, each row 14 of the crusher unit 5 comprises both at least one high crusher tooth 91 and at least one low crusher tooth 92.

According to an embodiment, the bucket crusher 1 comprises a plurality of mid crusher teeth.

The distance between the cylinder wall 8 and the distal end 11 of each mid crusher tooth is greater than the distance between the cylinder wall 8 and the distal end 11 of the low crusher tooth 92.

Furthermore, the distance between the cylinder wall 8 and the distal end 11 of each mid crusher tooth is less than the distance between the cylinder wall 8 and the distal end 11 of the high crusher tooth 91.

Advantageously, the arrangement of mid crusher teeth helps to increase the crushing efficiency of the bucket crusher 1, and increases the movement of the material to be crushed inside the bucket crusher 1.

According to an embodiment, the bucket crusher 1 comprises a screening mesh 17 connected to the box-shaped bucket body 2 at the unloading opening 4.

Advantageously, the screening mesh 17 ensures that the sheet material 12 crushed by the screening bucket 1 is expelled from the bucket crusher 1 only if it is of a smaller size than the lattice of the screening mesh 17.

Conversely, the screening mesh 17 retains inside the box-shaped bucket body 2 the crushed sheet material 12 having however a size greater than the lattice of the screening mesh 17, so that it is further crushed and the size thereof is further reduced.

According to an embodiment, the screening mesh 17 defines, in a section transverse to the rotation axis 7, a concave section which is offset with respect to the rotation axis 7 of the cylinder 6.

Such an offsetting defines a channel 18 converging between the cylinder wall 8 and the screening mesh 17.

Therefore, the size of the channel 18 is progressively reduced in the direction of the unloading opening 4.

Advantageously, such a convergence of the channel 18 progressively influences the sheet material 12 to be crushed against the crusher unit 5, thus facilitating the crushing thereof.

According to an embodiment, the screening mesh 17 is removably connectable to the box-shaped bucket body 2.

According to a preferred embodiment, the screening mesh 17 is connected to the box-shaped bucket body 2 by bolting.

Thereby, in case of need, it is possible to apply screening meshes 17, having lattices of different sizes, to the bucket crusher 1.

According to an embodiment, the lattice of the screening mesh 17 can have different shapes. By way of explanation, the screening mesh 17 defines a lattice with a circular, or square, or hexagonal, or rhomboidal shape.

According to an embodiment, the bucket crusher 1 comprises a plurality of counter-teeth 20.

The counter-teeth 20 are fixed to the box-shaped bucket body 2 and extend in the direction of the cylinder 6, so as to be interposed in a comb-like manner with the crusher teeth 9.

Advantageously, the counter-teeth 20 are configured to convey the sheet material 12 to be crushed against the crusher teeth 9, thus increasing the crushing efficiency of the bucket crusher 1.

According to an embodiment, the bucket crusher 1 comprises at least one lateral chute wall 21, preferably two opposite lateral chute walls 21, configured to convey the sheet material 12 entering from the loading compartment 3 in the direction of the crusher unit 5.

The at least one lateral chute wall 21 is fixed to the box-shaped bucket body 2, at the loading compartment 3.

According to a further aspect of the present invention, an earth-moving machine 19 is equipped with a bucket crusher 1 as described above.

Figure 13:
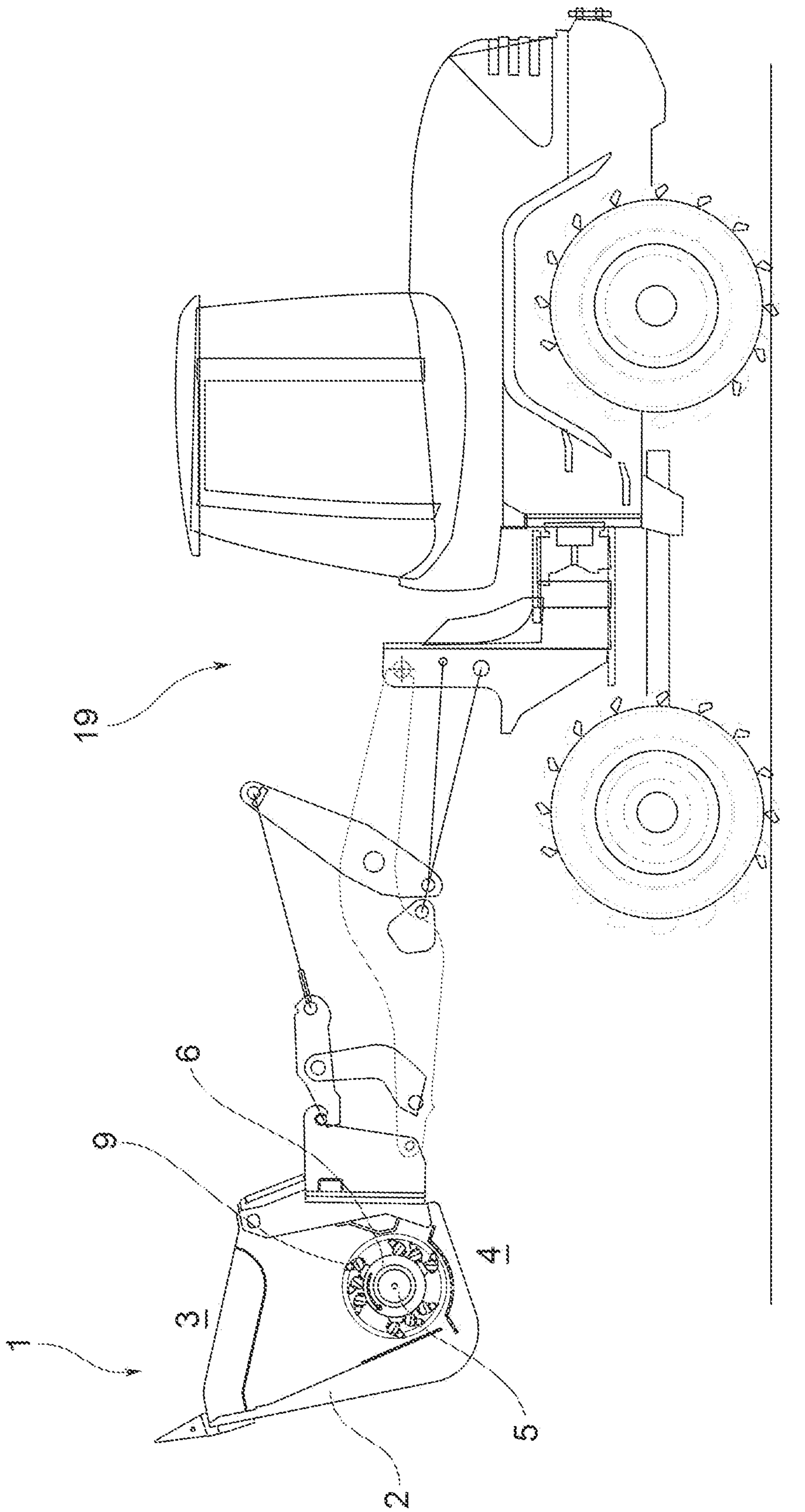
FIG. 13 shows a side view of a machine comprising a bucket crusher, according to an embodiment of the present invention.
Figure 14:
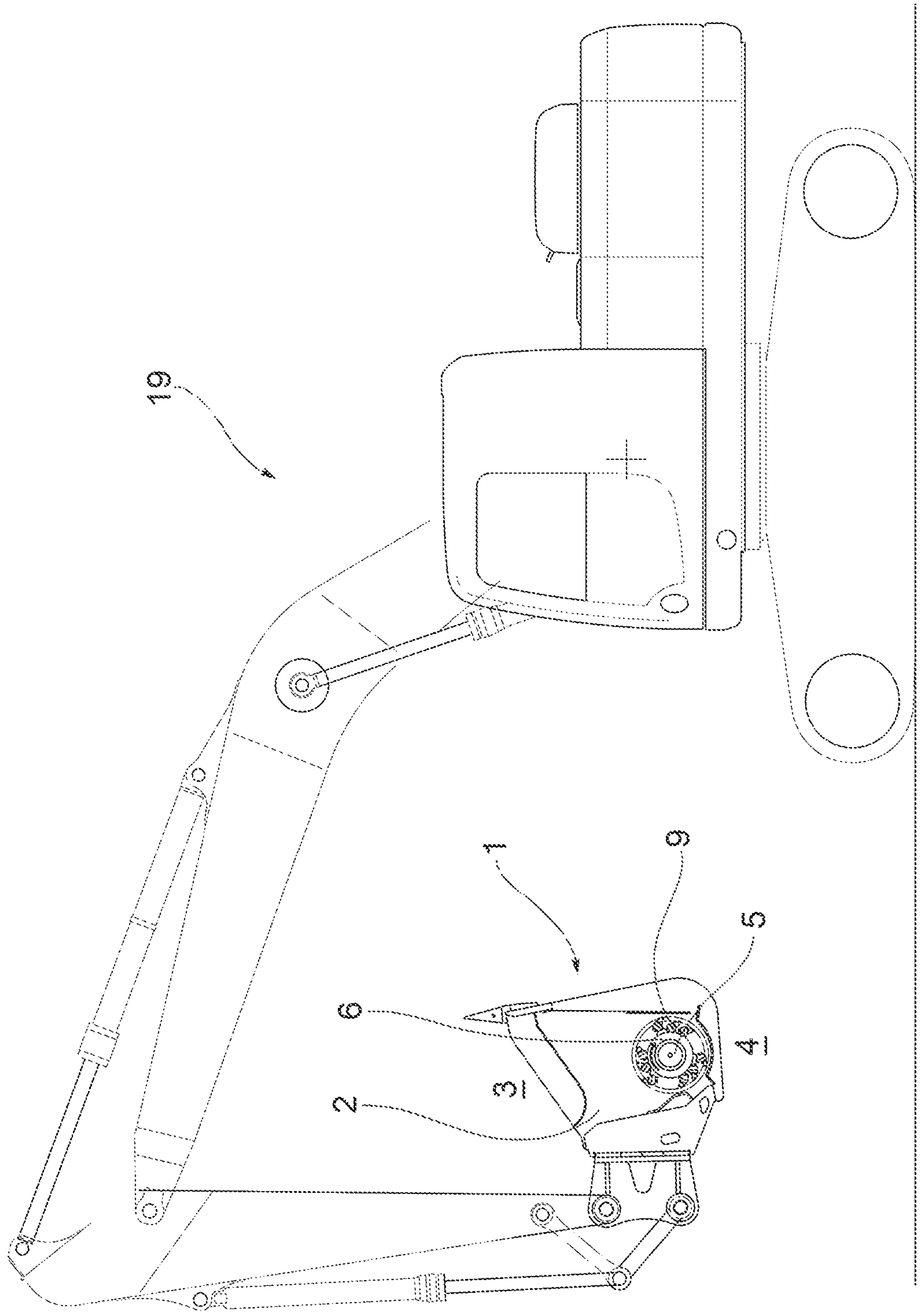
FIG. 14 shows a side view of a further machine comprising a bucket crusher, according to an embodiment of the present invention.
Figure 15:
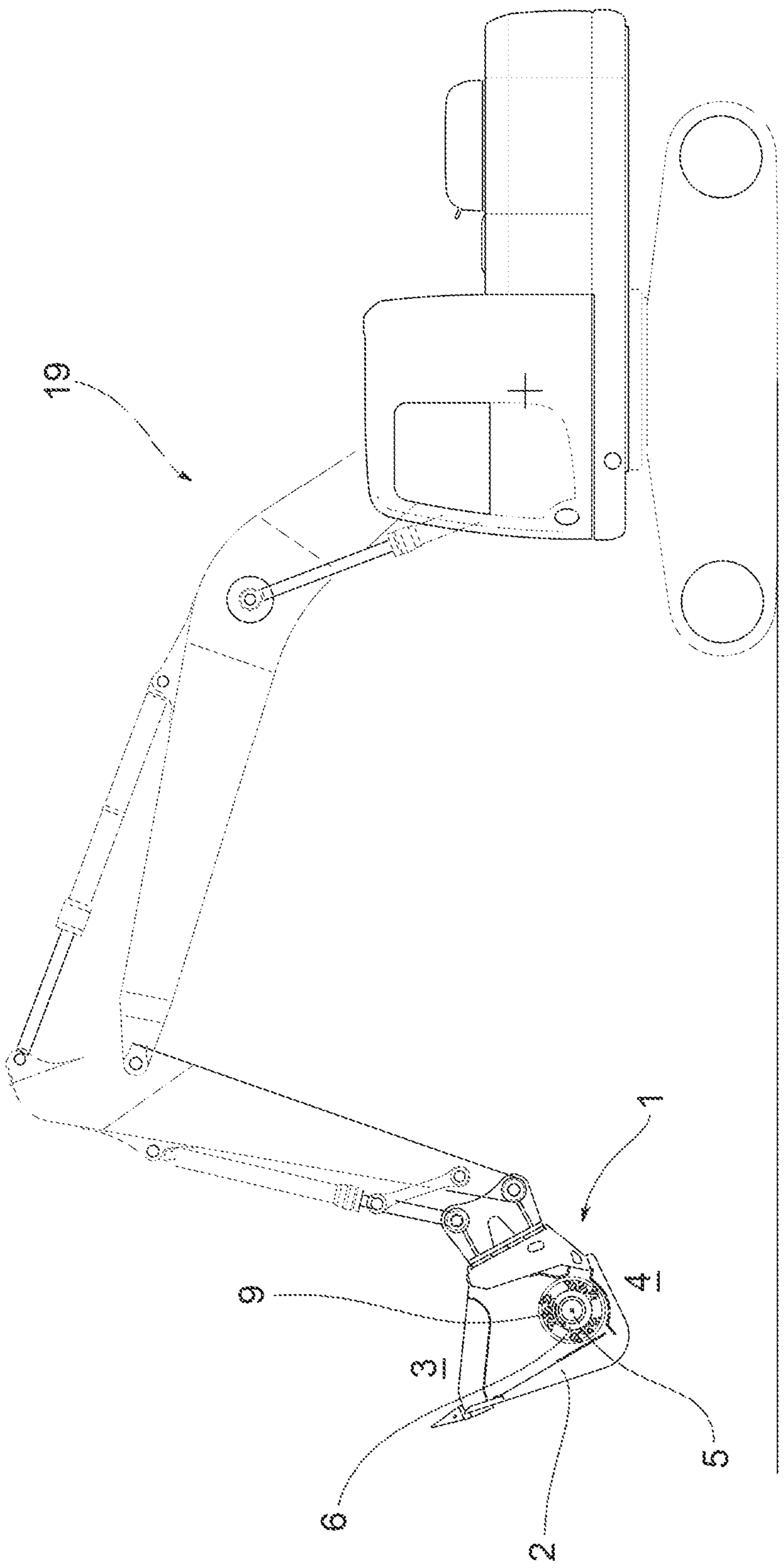
FIG. 15 shows a side view of a further machine comprising a bucket crusher, according to an embodiment of the present invention.

By way of explanation, the machine 19 can be an excavator (FIG. 14-15) or a shovel (FIG. 13).

Obviously, those skilled in the art will be able to make changes or adaptations to the present invention, without departing from the scope of protection as described and claimed herein.

LIST OF REFERENCE NUMBERS

1. Bucket crusher
2. Box-shaped bucket body
3. Loading compartment
4. Unloading opening
5. Crusher unit
6. Cylinder
7. Rotation axis
8. Cylinder wall
9. Crusher teeth
91. High crusher teeth
92. Low crusher teeth
10. Proximal end
11. Distal end
12. Sheet material
13. Base element
14. Row of crusher teeth
15. Rotation direction
16. Empty space
17. Screening mesh
18. Channel
19. Earth-moving machine
20. Counter-teeth
21. Lateral chute wall
22. Tooth angular dimension
23. Axial unit

What is claimed is:

1. A bucket crusher, comprising a box-shaped bucket body defining a loading compartment and an unloading opening, said bucket crusher comprising at least one crusher unit configured to crush sheet material, said at least one crusher unit comprising:

a cylinder, rotatable about a rotation axis and forming a cylinder wall, a plurality of crusher teeth connected to the cylinder wall, wherein each crusher tooth of the plurality of crusher teeth extends between a proximal end and a distal end, wherein the proximal end faces the cylinder wall and the distal end is opposite to the cylinder wall, wherein each crusher tooth defines a tooth angular dimension, wherein the plurality of crusher teeth comprises at least one high crusher tooth and at least one low crusher tooth, wherein a distance between the cylinder wall and the distal end of the at least one high crusher tooth is greater than the distance between the cylinder wall and the distal end of the at least one low crusher tooth, wherein the crusher teeth positioned on the cylinder wall define a plurality of axial units of crusher teeth, each said axial unit defined by a plurality of crusher teeth following one another in an angular direction with reference to the rotation axis, wherein an angular distance between each crusher tooth and a previous crusher tooth or a successive crusher tooth is less than the tooth angular dimension, so as to define on the cylinder wall a plurality of empty spaces without crusher teeth, said empty spaces having an angular extension equal to at least one tooth angular dimension and extending along an entire length of the cylinder wall.

2. The bucket crusher of claim 1, wherein the at least one crusher unit comprises a plurality of high crusher teeth and a plurality of low crusher teeth, and wherein the ratio of the number of high crusher teeth to the number of low crusher teeth is between 1:3 and 3:1; and/or wherein the ratio of a height of a high crusher tooth to a height of a low crusher tooth is between 3:1 and 11:10.

3. The bucket crusher of claim 2, wherein the at least one crusher unit comprises at least one base element connected to the cylinder wall, wherein the at least one base element is interposed between the cylinder wall and a respective high crusher tooth to raise the respective high crusher tooth with respect to one or more low crusher teeth, the bucket crusher comprising at least one of the following features or a combination thereof:

the high crusher teeth have the same shape as the low crusher teeth, the ratio of a height of the at least one base element to the height of a low crusher tooth, with reference to the cylinder wall, is between 1:6 and 1:1, the at least one base element is a prismatic block defining two opposite bases, wherein one base of the two opposite bases is fixed to the cylinder wall and the other base of the two opposite bases is fixed to the respective high crusher tooth.

4. The bucket crusher of claim 1, wherein the cylinder wall defines, in a plane transverse to the rotation axis, a polygonal section having at least three sides, or wherein the cylinder wall defines, in a plane transverse to the rotation axis, a circular section.

5. The bucket crusher of claim 1, wherein the crusher teeth are positioned on the cylinder wall according to an irregular arrangement.

6. The bucket crusher of claim 1, wherein the ratio of the angular extension of an empty space of the plurality of empty spaces to the tooth angular dimension, is between 4:1 and 1:1, the bucket crusher comprising at least one of the following features or a combination thereof:

all the empty spaces have an identical angular extension, the at least one crusher unit comprises at least two axial units of crusher teeth, all the crusher teeth of the same axial unit are offset with respect to one another in the angular direction, at least one axial unit exclusively consists of high crusher teeth or low crusher teeth, or at least one high crusher tooth and at least one low crusher tooth.

7. The bucket crusher of claim 1, wherein the crusher teeth define a tooth angular dimension, wherein the crusher teeth are positioned on the cylinder wall according to a substantially helical arrangement, and wherein the crusher teeth define a plurality of helices, wherein an angular distance between two helices of the plurality of helices is at least equal to the tooth angular dimension, or wherein the crusher teeth are positioned on the cylinder wall so as to define, in a direction substantially parallel to the rotation axis, a plurality of zig-zag lines, and wherein an angular distance between two following zig-zag lines is at least equal to the tooth angular dimension.

8. The bucket crusher of claim 1, wherein the crusher teeth positioned on the cylinder wall define a plurality of rows of crusher teeth, wherein each row consists of crusher teeth positioned on a same axis parallel to the rotation axis of the cylinder.

9. The bucket crusher of claim 1, comprising a plurality of mid crusher teeth, wherein the distance between the cylinder wall and the distal end of each mid crusher tooth of the plurality of mid crusher teeth is greater than the distance between the cylinder wall and the distal end of the at least one low crusher tooth, and wherein the distance between the cylinder wall and the distal end of each mid crusher tooth of the plurality of mid crusher teeth is less than the distance between the cylinder wall and the distal end of the at least one high crusher tooth.

10. The bucket crusher of claim 1, comprising a screening mesh connected to the box-shaped bucket body at the unloading opening, wherein the screening mesh defines, in a section transverse to the rotation axis, a concave section which is offset with respect to the rotation axis, wherein said offsetting defines a channel converging between the cylinder wall and the screening mesh, the bucket crusher comprising at least one of the following features or a combination thereof:

the screening mesh is removably connectable to the box-shaped bucket body, the screening mesh defines a lattice of circular, square, hexagonal, or rhomboidal shape, the bucket crusher comprises a plurality of counter-teeth attached to the box-shaped bucket body and extending in direction of the cylinder so as to be interposed in a comb manner with the crusher teeth, said counter-teeth being configured to convey the sheet material to be crushed against the crusher teeth, the bucket crusher comprises at least one lateral chute wall configured to convey the sheet material entering from the loading compartment, in direction of the at least one crusher unit, said at least one lateral chute wall being fixed to the box-shaped bucket body, at the loading compartment.

11. An earth-moving machine equipped with a bucket crusher according to claim 1, said earth-moving machine being an excavator or a shovel.

* * * * *